Oct. 3, 1933.         E. P. KNOX         1,929,360
PROJECTOR
Filed June 21, 1932         2 Sheets-Sheet 1
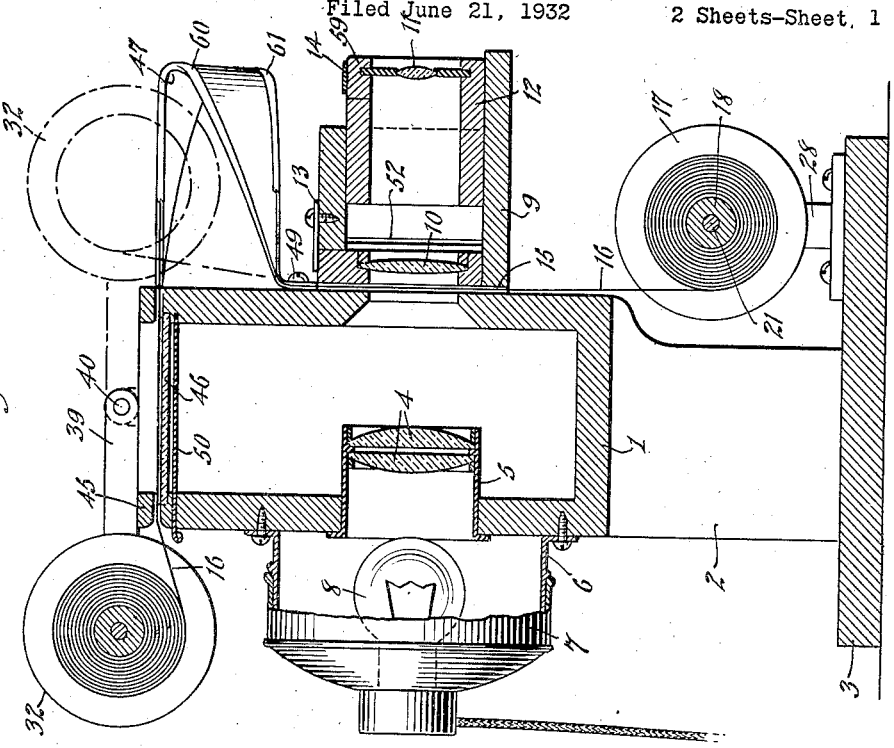
INVENTOR
Edward P. Knox
BY
Munn & Co.
ATTORNEY
WITNESSES
Edw. Thorpe
A. L. Kitchin Oct. 3, 1933.                 E. P. KNOX                    1,929,360
                              PROJECTOR
                          Filed June 21, 1932        2 Sheets-Sheet 2
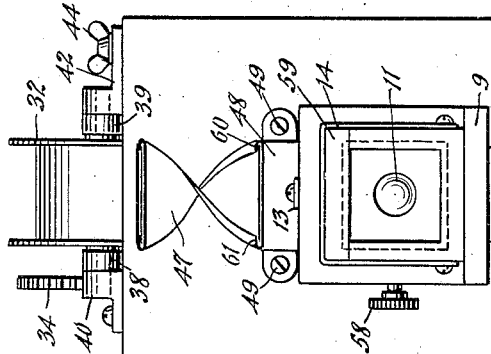
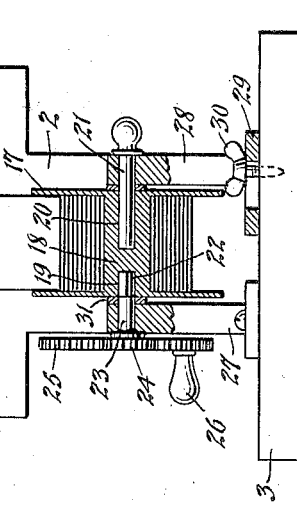
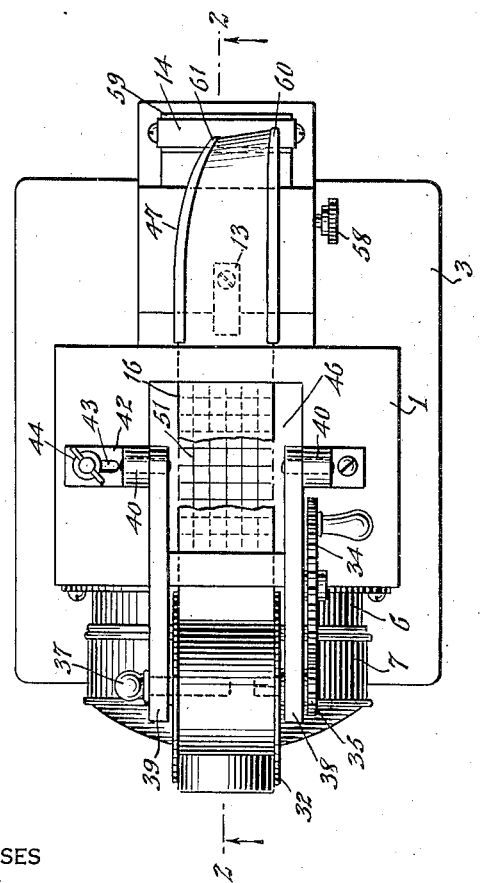
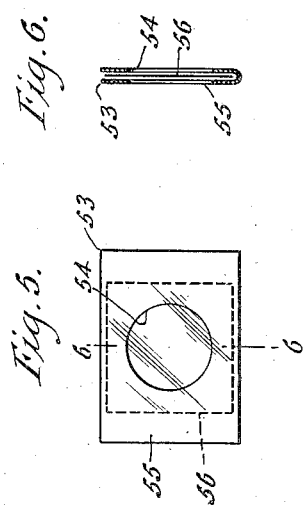
WITNESSES
Edw. Thorpe
A. L. Kitchin
INVENTOR
Edward P. Knox
BY Munn & Co.
ATTORNEY Patented Oct. 3, 1933

1,929,360

UNITED STATES PATENT OFFICE 1,929,360

PROJECTOR

Edward P. Knox, Toms River, N. J.

Application June 21, 1932. Serial No. 618,538

5 Claims. (Cl. 88—24)

This invention relates to projectors and has for an object to provide a simplified projector capable of using individual slides or films of various kinds, the structure being such that the film when used may be passed directly through the machine or may be reversed before passing through the machine.

Another object of the invention is to provide a simplified projector using an electric lamp or other source of light which acts to project a picture on a given surface, and also to illuminate a ground glass over which the film to be projected passes, the ground glass acting as a table for permitting a person to write on the film.

A further object of the invention is to provide a projector for films using a reel structure which may be swung from one position to the other so as to direct a reel directly through the machine or first past a writing table, and then to the projecting portion of the machine after having moved over a reversing device.

A still further object is to provide in a projector an adjustable lens structure arranged in such a way that a slot is provided for the insertion of colored members whereby the color of the projected picture may be varied.

In the accompanying drawings—

Figure 1 is a side view of a projector disclosing an embodiment of the invention.

Figure 2 is a sectional view through Figure 3 on line 2—2.

Figure 3 is a top plan view of the structure shown in Figure 1.

Figure 4 is a front view of the structure shown in Figure 1, the lower part being shown in section for illustrating the mounting of one of the reels.

Figure 5 is a side view of a colored slide.

Figure 6 is a sectional view through Figure 5 on line 6—6 illustrating how the slide is a looped member of paper or other material with a colored sheet arranged loosely therebetween.

Referring to the accompanying drawings by numerals, 1 indicates the body of the projector which has depending legs 2 connected with a base 3. The body 1 is hollow, as shown in Figure 2, and provided with a lens 4 supported by a holder 5, the purpose of the lens 4 is for the concentration or intensification of the light from the lamp through the positioning of a spot of light bearing directly on the forward projection lenses 10 and 11. This arrangement is of advantage where expensive, high powered lamps are not used as a lighting medium. In back of the lens 4 is a tubular support 6 on which the lamp holder or carrier 7 is slidingly mounted. An electric lamp 8 is shown as being carried by the holder 7 and supplied with current in any desired manner. The holder 7 is held in place by friction and may be slid back and forth to adjust the position of the light 8 in order to secure desired results.

A lens-carrying bracket 9 is secured in any desired manner to the body 1 and is adapted to support a stationary lens 10 and a sliding lens 11, which latter lens is mounted in a sliding sleeve 12. The bracket 9 is shown as square and hollow so that the sleeve 12 may freely slide but cannot rotate. The frame of the lens 10 is held in place by a suitable abutment 13 so that normally it is held stationary but may be removed at any time. The sleeve 12 is adapted to be adjusted to any desired position and then locked by the set screw 58, the lens 11 being locked in place by strap 14, which strap is adapted to be swung toward the front and downwardly out of the way when the lens 11 is to be removed.

As shown particularly in Figure 2, there is provided a passageway 15 in between part of the bracket 9 and the body 1, whereby a strip or film 16 may readily pass between the lenses 4 and 10 along side of the outer surface of the body 1. The strip or film 16 is adapted to be wound on a spool 17, said spool preferably having a solid core 18, as shown in Figure 4, and provided with a square bore 19 and a round bore 20, bore 20 being adapted to receive a round pin 21, while the squared end 22 of shaft 23 extends into the bore 19. A pinion 24 is rigidly secured to the shaft 23 and continually meshes with the gear 25, which gear is provided with a knob 26, whereby the gear may be rotated, and, consequently, the reel 17 rotated.

The shaft 23 is supported on a stationary standard 27 secured by screws or otherwise to the base 3, while the pin 21 is supported by an adjustable standard 28. The standard 28 has a slotted foot 29, and one or more screws 30 extend through the slot in this foot and into the base 3, whereby the standard 28 may be locked in any desired adjusted position. When it is desired to remove the reel 17, screw 30 is loosened and the standard 28 moved away from the standard 27, after which the pin 21 is removed and then the reel 17 slid off of the squared end 22. The parts are replaced by reverse action.

By making the standard 27 stationary, and the reel 17 lightly pressing against the washer 31, the reel 17 is in proper alignment with the slot 15 and with the respective lenses. This reel is used when a film is used, and the film may be moved downwardly at any rate of speed continuously, or may be moved intermittently according to circumstances. The upper reel 32 coacts with the reel 17 to support the film 16 and permit a movement thereof. Where the film or transparent strip 16, of celluloid, cellophane or other material, is provided with groups of pictures, or written or printed matter, preferably the reel 17 is operated intermittently to show these groups independently as still pictures. Where a film may have a complete story or other matter written thereon, and the same extends from one end of the film to the other, the film is usually moved by the reel 32 and the movement is upwardly and slowly so that the respective lines will successively move into the line of vision and then upwardly and out of the line of vision. This method of disseminating information has been known in the moving picture art, but the structure used there is different from the structures used heretofore, though the result, as far as the gradual changing of the reading matter is concerned, is the same.

When the film is used as just described, the reel 32 is in the dotted position shown in Figure 2 and is operated by a person actuating the knob 33, which is secured to the gear wheel 34, said gear wheel continually meshing with the pinion 35. The pinion 35 is rigidly secured to the shaft 36 which is identical in structure with the shaft 23, and which coacts with the pin 37, identical with pin 21. However, shaft 36 is journaled into the outer end of a swinging arm 38, and pin 37 is journaled into the outer end of a swinging arm 39. The arm 38 is pivotally mounted at 40 on top of the body 1, while the arm 39 is pivotally mounted on a bracket 42, as shown in Figure 3, said bracket having a slot 43 through which a clamping screw 44 extends, whereby this bracket may be slid back and forth to permit the reel 32 to be removed in a similar manner to the way the reel 17 is removed.

Where the film has been previously prepared the same is moved upwardly or downwardly as desired with the upper heel in the dotted position shown in Figure 2. However, where matter is to be written on the film or strip 16, or pictures are to be drawn thereon, the reel 32 is swung over to the position shown in Figure 2, and the film is threaded beneath the guide bar 45 and over a ground glass plate 46, and from thence into a reversing guide 47. The reversing guide 47 is provided with suitable ears 48 secured to the body 1 by suitable screws 49. The parts shown in Figure 2 are arranged in the position just described so that when the reel 17 is rotated the film will be drawn over the reel 32, passed over the ground glass support or table 46, through the reversing guide 47, and then down through the slot or opening 15 past the beam of light provided by the lamp 8. When the device is used as just described, a sheet metal plate 50 is removed. When this take place there is enough diffused light from the lens 4 to somewhat illuminate the table or plate 46 so that a person may readily write on the film, the same being stationary. In order that the person writing or drawing on the film may be somewhat guided, a number of cross lines 51 (Figure 3) are etched or otherwise formed on the table or glass plate 46. For instance, when election returns are being projected on a screen, the arrangement shown in Figure 2 is desirable as the operator may write or draw any desired information on the film and then move the same to the position in front of the light. As the returns come in the operator will write on the film immediately above the plate 46 all that the space will receive and then preferably rotate the film 17 only a short distance, namely, the distance of one exposure. The operator may then write some further returns and repeat the operation. This is adapted to be carried on as long as desired. The size of the platform 46 is preferably approximately twice the size of one exposure through the lenses, and, consequently, when writing anything on the film, the same may be arranged to be in lines and successively pass a beam of light or may be all confined in the prescribed space for one exposure. Where the writing or figures are continuous, the film will be moved slowly past the projected light, but where the writing is arranged in groups of a size to provide one exposure, the film is moved intermittently. When a certain group of information is opposite the light, the film is stopped for any desired length of time.

Illustrated particularly in Figures 1 and 2 is a slot 52 provided in the bracket 9 and positioned between the forward lenses, whereby a colored glass plate, or a piece of celluloid, cellophane, or other transparent or semi-transparent material may be inserted between the forward lenses changing the color or shape of the picture or other matter projected. While a glass plate or other colored sheet may be used it has been found that a very simple and cheap slide will produce very good results. In Figure 5, a piece of paper 53 has been folded and provided with apertures 54 and 55 so that when a piece of colored cellophane or other colored transparent or semi-transparent material 56 is inserted, the aggregation may be slipped into the slot 52 and produce the desired color on the screen. Where the film 16 is not being used, but slides are to be used, they may be inserted through the slot 57 as shown in Figure 1.

If desired, the strap 14 could be eliminated and the lens 11 locked in any desired position. However, the strap 14 functions to hold the block or plate 59 in place and thereby prevents any accidental removal or loose motion on the lens 11.

Referring again to the reversing guide 47, it will be seen that this guide is preferably formed of sheet material, as, for instance, sheet metal and twisted to secure one reversal of the film as it moves from the table 46 to the slot 15. The guide 47 is made out of flat sheet material and the edges 60 and 61 are turned over to provide overhanging shoulders, and thereby present in a certain sense side grooves for receiving the side portions of the film as it passes over the guide. When the reel 32 is in the dotted position shown in Figure 2, the reversing guide 47 is removed.

I claim:—

1. A projector of the character described including suitable projecting lenses, means for projecting light through said lenses, means for guiding a film past said lenses, a reversing guide for said film, and means for guiding the film to said reversing guide said reversing guide comprising a sheet strip having the edges turned toward each other to provide film guiding grooves, said strip being twisted so that at one end said inturned edges are on one side of the strip and at the other end they are on the opposite side.

2. A projector of the character described including projecting lenses, a lamp for projecting light through said lenses, an upper reel, a lower reel, said reels being adapted to move a film past said lenses, means for swingably mounting the upper reel so that the upper reel when in one position will be above the lower reel and when in another position will be at the upper end but in back of the projector, a writing table at the top of said projector, means for guiding the film from the upper reel while it is in back of the projector so that it will move over said table, and a reversing guide arranged at the front of the projector with the receiving end opposite said writing table for receiving, reversing and guiding a film past the lenses while in a reversed position when the upper reel is in back of the projector.

3. A projector including a body having a translucent plate at the upper end, projecting lenses carried by the body, a lamp for supplying light through said lenses, said lamp and certain of said lenses permitting some of the light to pass through said translucent plate, a pair of reels for a film, one of said reels being arranged near the bottom and front of the body and the other near the top and rear of the body, said last-mentioned reel holding the film so that it may be moved across said translucent plate, and a reversing guide for receiving said film after it passes said plate, said reversing guide directing the film past said lenses to the lower reel.

4. In a projector, a body, a lower forward reel and an upper rearward reel, a platform, means for guiding a film from said upper reel over said platform whereby the film may be written upon while in position over the platform, a reversing guide for receiving and reversing the film after it leaves said platform, said reversing guide directing the film in a reversed position to said forward reel, and means including a light and lenses for projecting the matter on the reel.

5. In a projector, a body, projecting lenses carried by the body, means forming a slidway for the reception of a colored member for changing the color or shape of a projected picture, said slideway being positioned between the forward projecting lenses carried by the body, a slide removably fitted in said slideway, said slide including an apertured folded strip of paper forming a support U-shaped in cross section and a colored substantially transparent sheet arranged between the folds of said strip, and means for removably positioning said slide so that the matter thereon may be projected.

EDWARD P. KNOX.